March 6, 1962     E. J. H. FIALA     3,024,037
WHEEL SUSPENSION AND COMPENSATING MECHANISM FOR VEHICLES
Filed Oct. 14, 1957     2 Sheets-Sheet 1
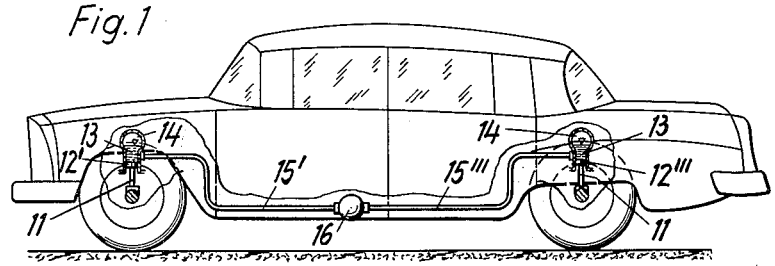
Fig.1
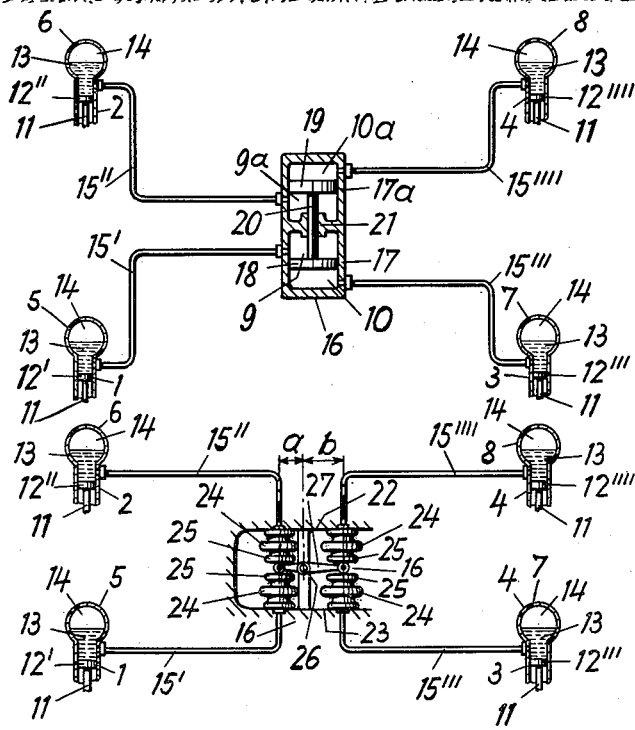
Fig.2
Fig.3
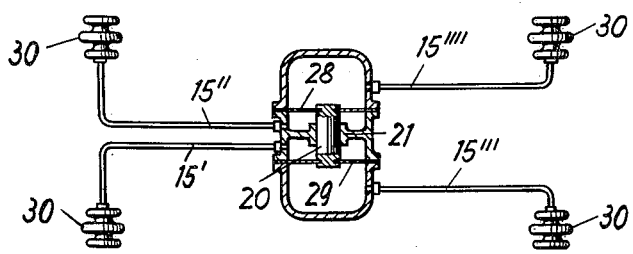
Fig.4
INVENTOR
ERNST J. H. FIALA
BY *Duke and Craig*
ATTORNEYS March 6, 1962 E. J. H. FIALA 3,024,037
WHEEL SUSPENSION AND COMPENSATING MECHANISM FOR VEHICLES
Filed Oct. 14, 1957 2 Sheets-Sheet 2

INVENTOR
ERNST J. H. FIALA

BY  Dicke and Craig

ATTORNEYS

United States Patent Office 3,024,037
Patented Mar. 6, 1962

3,024,037
WHEEL SUSPENSION AND COMPENSATING
MECHANISM FOR VEHICLES
Ernst J. H. Fiala, Sindelfingen, Kreis Boeblingen, Germany, assignor to Daimler-Benz Aktiengesellschaft, Stuttgart-Untertuerkheim, Germany
Filed Oct. 14, 1957, Ser. No. 690,089
Claims priority, application Germany Oct. 16, 1956
8 Claims. (Cl. 280—104)

The present invention relates to individual wheel suspensions for vehicles, and particularly automobiles and the like, and to a compensating mechanism for balancing the vertical movements of the individual wheels relative to each other.

In generally describing the present invention, the wheel suspension and compensating mechanism essentially consists in providing each wheel with a hydraulic or pneumatic cylinder, bellows, or the like which serves as the element for resiliently suspending and mounting each wheel on the vehicle frame or body, and which is connected by a separate conduit to a movable element or surface, for example, a piston, in a compensating mechanism which is centrally mounted on the frame or body intermediate the front and rear wheels. According to a preferred embodiment of the invention, the movable elements or surfaces which are operatively associated with the two front wheels or the two rear wheels, respectively, are rigidly connected to each other, and each of them is acted upon by the hydraulic or pneumatic medium in opposite directions to the other. According to another embodiment of the invention, the connection between the two movable elements or surfaces may also be made resilient.

A preferred feature of the present invention consists in designing the central compensating mechanism in the form of two cylinders in a tandem arrangement which are preferably combined to form a single unit and are separated by a partition in which a piston rod is slidably mounted which carries a pair of pistons on both ends which are slidable within the two cylinders. The hydraulic or pneumatic medium which is displaced by the vertical movements of each of the rear wheels, respectively, is admitted into the cylinders so as to act, for example, upon the outer piston surfaces, while the medium which is displaced by the vertical movements of each of the front wheels acts, for example, upon the inner piston surfaces, or vice versa. By making the cross-sectional area of the piston rod of a suitable size, the surface area of the inner piston surfaces may be made of such a ratio to the free outer piston surfaces that it is possible to determine the load distribution upon the individual wheels which is affected by the additional load upon the wheels facing toward the outside of a curve and the load reduction upon the wheels facing toward the inside of the curve, and thus to control the tendency of the vehicle to "underride" or to "override."

According to another embodiment of the invention, the central compensating mechanism may consist of a pair of diaphragms in place of the pistons as previously described. The operation of this mechanism is thus very similar to that according to the first embodiment.

The central compensating mechanism according to a further embodiment of the invention contains a pair of base plates whih are rigidly mounted on the frame or body of the vehicle and on which four resilient bellows or the like are mounted so that one pair of bellows faces toward the other pair and the bellows associated with the front wheels and with the rear wheels, respectively, face toward each other. The inner ends of these bellows are closed and each of them carries a pressure plate. Each of these bellows is connected by a separate conduit to an individual pneumatic or hydraulic wheel suspension device similar to the one as previously described. The two bellows associated with the wheels at one side of the vehicle are separated from those associated with the wheels at the other side by a two-armed lever which is pivotally mounted on a part of the frame or body of the vehicle or on a part which is rigidly connected thereto so that its two free ends will be acted upon by the individual bellows, and the movements thereof corresponding to the vertical movements of the individual wheels will be transmitted to each other. The two-armed lever is preferably mounted at a point which is disposed more closely to the bellows which are associated with one set of wheels than to the other, that is, either to those for the front wheels or to the rear wheels, respectively. These unequal lever arms will then correspond in function to the unequal piston surfaces of the first-mentioned embodiment of the invention, the inequality of which is due to the reduction in surface area of the inner piston surfaces by the presence of the connecting piston rod thereon.

The central compensating mechanism according to the invention may also consist of a pair of gear pumps or the like which are associated with the front and rear wheels, respectively, and are coupled to each other. The gear wheels of the two gear pumps or the like are preferably of different diameters in order to attain a different load distribution upon the front or rear wheels when the vehicle is being driven along a curve.

Accordingly, it is an object of the present invention to provide a wheel suspension and compensating mechanism in which the individual wheels are connected with each other in such a manner that, when one wheel runs over an obstacle on the road and moves upwardly toward the frame or body of the vehicle, the diagonally opposite wheel will likewise move upwardly, while the two other wheels will at the same time move downwardly relative to the frame or body of the vehicle.

Another object of the present invention is to provide a wheel suspension and compensating mechanism which requires very little space and very few individual parts, is of low weight, quite inexpensive, and requires very little service, if any.

Further objects, features, and advantages of the present invention will be apparent from the following detailed description thereof, particularly when read with reference to the accompanying drawings, in which—

FIG. 1 shows a passenger car with a part of the car body broken away and indicated in dotted lines to illustrate the central compensating mechanism according to the invention;

FIG. 2 shows a diagrammatic view of the central compensating mechanism per se consisting of two pistons within a double cylinder;

FIG. 3 shows a similar diagrammatic view of a central compensating mechanism according to a modification of the invention;

FIG. 4 shows a similar view of a further modification of the central compensating mechanism according to the invention; while FIG. 5 shows a diagrammatic perspective view of still another modification of the central compensating mechanism which consists of a pair of gear pumps or the like.

Figure 5:
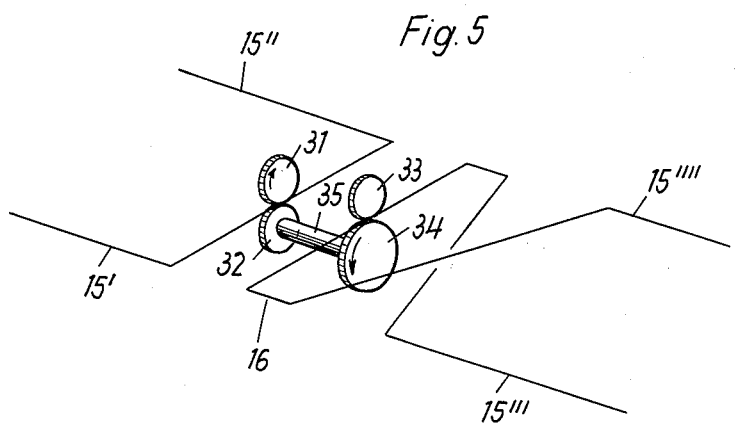

In the accompanying drawings, the actual means for resiliently suspending and mounting the individual wheels on the chassis of a vehicle are only indicated diagrammatically since their specific construction may differ within wide limits. In the embodiments as illustrated in FIGS. 1 to 3, the suspension system is of a combined hydraulic and pneumatic type, while that according to the embodiment as illustrated in FIG. 4 is purely of a pneumatic type. In all of the embodiments, the suspension means of each wheel of a vehicle are connected by individual conduits to a central compensating mechanism.

In the embodiments according to FIGS. 1 to 3, the axle of each individual wheel of a vehicle is connected by means of a rod 11 provided with a piston 12', 12" 12''', and 12'''', respectively which is slidable within a cylinder 1, 2, 3, or 4, respectively, and adapted to displace a hydraulic fluid 13 therein which, when the respective wheel moves upwardly, compresses a pneumatic medium 14 within a closed container 5, 6, 7, or 8, respectively. The actual cushioning means are therefore pneumatic also in this embodiment. The individual cyclinders 1, 2, 3, and 4 are connected to the central compensating mechanism 16 by separate conduits 15', 15", 15''', and 15'''', respectively.

This central compensating mechanism may, according to FIG. 2, consist of two cylinders 17 and 17a which are disposed in a tandem arrangement behind each other and are preferably combined to form a single integral unit.

Each of cylinders 17 and 17a has a piston 18 or 19, respectively, slidably mounted therein. These two pistons are rigidly connected to each other by a common piston rod 20 which is slidable within a partition 21 which tightly seals the two cylinders relative to each other. The two conduits 15' and 15" which are connected to cylinders 1 and 2 of the front wheels terminate within chambers 9 and 9a in cylinders 17 and 17a which are limited by partition 21 and pistons 18 or 19, respectively while conduits 15''' and 15'''' which are connected to cylinders 3 and 4 of the rear wheels terminate within chambers 10 and 10a in the cylinders 17 and 17a formed at the outside of pistons 18 and 19.

The operation of this wheel suspension and compensating system is as follows:

Assuming that the left front wheel runs over an obstacle and therefore moves upwardly toward the frame of the vehicle, piston 12' will displace the hydraulic fluid 13 in the upward direction and pass the same through conduit 15' to chamber 9 whereby piston 18, and thus also piston 19, will be moved downwardly. Pistons 12" and 12''', and the respective wheels which are connected thereto will then move downwardly relative to the frame of the vehicle, while piston 12'''', together with its respective wheel, will move upwardly. The vertical movements of each wheel relative to the vehicle frame therefore compensate each other in a very simple manner without affecting the frame and body of the vehicle.

When driving the vehicle along a curve, the centrifugal force then occurring will produce an additional load upon the wheels which face toward the outside of the curve and a corresponding load decrease upon the wheels facing toward the inside of the curve. By selecting a suitable ratio between the cross-sectional area of piston rod 20 and the unloaded outer surfaces of pistons 18 and 19 it is possible to distribute the addtiional load or load decrease of the respective wheels either more toward the front wheels or toward the rear wheels since pistons 18 and 19 will always adjust themselves so that the product of the pressure and the respective available piston surface will be constant at both sides of one piston. Since the inner piston surface is smaller than the outer piston surface by the cross-sectional area of piston rod 20, the additional pressure increase occuring, for example, in a left-hand curve will be distributed to the two right-hand wheels in such a manner that a higher pressure will be present in conduit 15" than in conduit 15''''. In this case, the right front wheel will therefore be more highly loaded and the left front wheel be more unloaded than the right rear wheel will be loaded and the left rear wheel will be unloaded. By distributing the load increases and decreases caused by the centrifugal force upon the front and rear wheels, respectively, it is thus possible to control the action of the vehicle in a curve, that is, the so-called "overriding" or "underriding" of the vehicle, in the most desirable manner.

Another important advantage of the wheel suspension and compensating system resides in the following fact. In motor vehicles which are provided with compensating springs between the two front wheels or the two rear wheels only or between both front wheels and both rear wheels only, and in which, for example, when the right rear wheel moves upwardly toward the vehicle frame, the left rear wheel will move downwardly, the vehicle will assume a strong side-tilt angle since the compensating springs do not produce any restoring forces to counteract the tilting of the vehicle body about its longitudinal axis. The wheel suspension and compensating mechanism according to the present invention will also considerably improve these disadvantages of prior wheel suspensions since, when the vehicle drives along a curve, the two wheels at one side of the vehicle will carry out vertical movements in opposite directions relative to the vehicle frame so that the yielding of one wheel axle will be counteracted by an increased resistance of the suspension of the other axle.

If the piston rod 20 according to FIG. 2, instead of being made rigid as illustrated, is made resilient in its longitudinal direction, it will produce a reduction of the restoring forces during pitching movements of the vehicle about a transverse axis. Thus, by making the connection between pistons 18 and 19 of a suitable resilience it will also be possible to control and considerably reduce these pitching movements of the vehicle.

The modification of the invention is illustrated in FIG. 3 differs from the embodiment as shown in FIG. 2 only by the design of the central compensating mechanism but not by its operation. Each conduit 15' to 15'''' which is connected at one end to one of cylinders 1 to 4 is secured at the other end to a base plate 22 or 23, respectively, which is rigidly secured to the frame or body of the vehicle. Two pairs of bellows 24 are mounted between base plates 22 and 23 and each bellows is connected at its outer end to one of conduits 15' to 15'''', while the inner ends of all of the bellows 24 are closed by plates 25. The outer ends of a two-armed lever 27 which is pivotably mounted on a rigid cross bar 26 between base plates 22 and 23 are interposed between the two end plates 25 of each pair of bellows 24 which is associated with the front wheels and rear wheels, respectively. The two arms of lever 27 are pivotably mounted on cross bar 26 so as to differ from each other in length, as indicated at "a" and "b" in FIG. 3.

The interdependence of the vertical resilient movements of the individual wheels when passing over an obstacle will be evident from FIG. 3 and is similar to that as described with respect to the first embodiment according to FIG. 2. This similarity also applies to the action of a vehicle which is equipped with this compensating mechanism while driving along a curve. When driving, for example, along a left-hand curve, the pressure increase in conduit 15" which is caused by the increase in load upon the right front wheel should be balanced by making it larger at the ratio of $b$ to $a$ than the pressure increase in conduit 15'''' which is associated with the right rear wheel. The rolling moment of the vehicle body about its longitudinal axis which is produced by the centrifugal force will thus also in this embodiment of the invention be taken up more by the front wheels than by the rear wheels.

The wheel suspension and compensating mechanism as illustrated in FIG. 4 differs from the embodiment according to FIG. 2 merely by the fact that pistons 18 and 19 of the latter are replaced by diaphragms 28 and 29 and that the individual wheel suspension is attained by purely pneumatic means and not by a combination thereof with hydraulic means. Consequently, in FIG. 4, the pneumatic resilient suspension means for each wheel are indicated, for example, by bellows 30. The air pressure produced in these bellows by the vertical movement of the wheels is then transmitted through conduits 15 to the central compensating mechanism 16. The operation of the entire mechanism is therefore similar to that as illustrated in FIG. 2.

The further embodiment of the invention as diagrammatically illustrated in FIG. 5 shows two pairs of gears 31, 32 and 33, 34, respectively, which form gear pumps which are associated with the two front wheels through conduits 15' and 15'', and with the two rear wheels through conduits 15''' and 15'''', respectively. The two gear wheels 32 and 34 are connected to each other by a shaft 35. The operation of this compensating mechanism is again similar to those previously described. Thus, for example, if the left front wheel moves upwardly, the pumps will rotate in the direction shown by the arrows whereby the hydraulic fluid will be passed from conduit 15' to conduit 15'' and that from conduit 15'''' to conduit 15'''. Consequently, the right front wheel and the left rear wheel will move downwardly relative to the vehicle body, while the right rear wheel will move upwardly. Since the two sets of wheels 31, 32, and 33, 34 are of different diameters, the hydraulic system will only be in a state of balance when driving along a curve, that is, when an additional pressure occurs, for example, in conduits 15'' and 15'''', if the pressure in conduit 15'''' will be lower than that in conduit 15''. Consequently, there will be a stronger additional load upon the front wheels, and a corresponding load decrease at the other vehicle side. This larger difference in pressure between the front wheels as compared with that between the two rear wheels will result in a tendency of the vehicle to "underride."

Although the present invention has been illustrated and described with reference to the preferred embodiments thereof, it should be understood that it is in no way limited to the details of such embodiments but is capable of numerous modifications within the scope of the appended claims. Thus, for example, in some cases it may be desirable that the motor vehicle will have a tendency to "override" in a curve. Conduits 15 may then be connected to the central compensating mechanism or the latter may be designed in such a manner that, when driving the vehicle along a curve, the additional load will be taken up to a larger extent by the rear wheels. A motor vehicle which is equipped with such a compensating mechanism will therefore have a tendency to "override."

Having thus fully disclosed my invention, what I claim is:

1. A wheel suspension and compensating mechanism for a vehicle having a body, a set of front wheels, and a set of rear wheels thereon, comprising means for individually and resiliently suspending each wheel on said body, said suspension means comprising a container for each wheel containing a pressure fluid, means connected to each wheel for displacing said pressure fluid when said wheel moves in a substantially vertical direction, pressure-compensating means comprising a plurality of movable members, conduits connecting each of said containers to one of said members for conveying said pressure fluid to said members to move the same, and means for positively connecting said movable members with each other so that a movement of one of said members caused by a vertical movement of one of said wheels toward said vehicle body will be transmitted to the other members and through the pressure fluid within said conduits and containers to the other wheels, said movable members including a pair of cylinders extending substantially coaxially to each other, a piston slidable within each cylinder and separating the same into an outer and inner chamber, and a piston rod slidably extending through one wall of each cylinder and positively connecting said pistons to each other, said conduits connected to said containers associated with one set of wheels being connected to said outer chambers of said cylinders, and said conduits connected to said containers associated with the other set of wheels being connected to said inner chambers of said cylinders.

2. A wheel suspension and compensating mechanism for a vehicle having a body, a set of front wheels, and a set of rear wheels thereon, comprising means for individually and resiliently suspending each wheel on said body, said suspension means comprising a container for each wheel containing a pressure fluid, means connected to each wheel for displacing said pressure fluid when said wheel moves in a substantially vertical direction, pressure-compensating means comprising a plurality of movable members, conduits connecting each of said containers to one of said members for conveying said pressure fluid to said members to move the same, and means for positively connecting said movable members with each other so that a movement of one of said members caused by a vertical movement of one of said wheels toward said vehicle body will be transmitted to the other members and through the pressure fluid within said conduits and containers to the other wheels, said movable members including a pair of cylinders extending substantially coaxially to each other, a diaphragm mounted within each cylinder and separating the same into an outer and an inner chamber, and a connecting rod slidably extending through one wall of each cylinder and positively connecting said diaphragms to each other, said conduits connected to said containers associated with one set of wheels being connected to said outer chambers of said cylinders, and said conduits connected to said containers associated with the other set of wheels being connected to said inner chambers of said cylinders.

3. A wheel suspension and compensating mechanism as defined in claim 1, wherein said walls of said two cylinders through which said piston rod slidably extends are integral with each other and seal said inner chambers relative to each other and combine said two cylinders to form a single unit.

4. A wheel suspension and compensating mechanism as defined in claim 2, wherein said walls of said two cylinders through which said connecting rod slidably extends are integral with each other and seal said inner chamber relative to each other, and combine said two cylinders to form a single unit.

5. A wheel suspension and compensating mechanism for a vehicle having a relatively stationary part, a set of front wheels, and a set of rear wheels thereon, comprising means for individually and resiliently suspending each wheel on said relatively stationary part, said suspension means comprising a container for each wheel containing a pressure fluid, means connected to each wheel for displacing said pressure fluid when said wheel moves in a substantially vertical direction, pressure-compensating means provided with a plurality of movable pressure members with two pressure surfaces each operative to be effective in mutually opposite directions upon application thereto of said pressure fluid, the two pressure surfaces for each of said movable members being of different cross-sectional area, conduits individually connecting each of said containers respectively to one of said pressure surfaces for individually conveying the pressure fluid from said set of front wheels to two of said pressure surfaces to move the same in mutually opposite directions and for individually conveying the pressure fluid from said set of rear wheels to two others of said pressure surfaces to move the same also in mutually opposite directions, means operatively connecting said pressure surfaces with each other so that a movement of one of said members caused by a vertical movement of one of said wheels toward said relatively stationary part will be transmitted to the other members and through the pressure fluid within said conduits and containers to the other wheels, and means for controlling the distribution upon the individual wheels of the additional load experienced when the vehicle passes through a curve, said last-mentioned means including said means operatively connecting said pressure surfaces with each other and said pressure surfaces.

6. A wheel suspension and compensating mechanism as defined in claim 5, wherein said pressure-compensating means include cylinder means for said movable members, said container for each wheel containing an air cushion which is adapted to be subjected to pressure by said displacing means for resiliently supporting said wheel, said pressure being transmitted through said conduit to said cylinder means to act upon said movable members therein.

7. A wheel suspension and compensating mechanism as defined in claim 5, wherein said pressure-compensating means include cylinder means for said movable members, said container for each wheel containing an air cushion, as well as a hydraulic fluid which is adapted to be displaced by said displacing means to act upon said air cushion for resiliently supporting said wheel, and to be transmitted through said conduit to said cylinder means to act upon said movable members therein.

8. A wheel suspension and compensating mechanism as defined in claim 5, wherein said conduits and said movable members are disposed relative to each other so that a substantially vertical movement of one of said wheels toward said vehicle body is transmitted through said pressure fluid to said compensating means and results in a corresponding movement of the diagonally opposite wheel and in an opposite movement of the other two wheels.

References Cited in the file of this patent

UNITED STATES PATENTS

| | | |
|---|---|---|
| 2,593,040 | Lloyd | Apr. 15, 1952 |
| 2,644,699 | Weiertz | July 7, 1953 |
| 2,828,138 | Brueder | Mar. 25, 1958 |

FOREIGN PATENTS

| | | |
|---|---|---|
| 909,972 | France | Jan. 14, 1946 |
| 1,030,729 | France | Mar. 18, 1953 |